United States Patent [19]

Coccoli

[11] Patent Number: 4,840,489

[45] Date of Patent: Jun. 20, 1989

[54] INTERFEROMETER GYROSCOPE HAVING TWO FEEDBACK LOOPS

[75] Inventor: Joseph D. Coccoli, Sudbury, Mass.

[73] Assignee: The Charles Stark Draper Laboratory, Inc., Cambridge, Mass.

[21] Appl. No.: 899,540

[22] Filed: Aug. 22, 1986

[51] Int. Cl.[4] .............................................. G01B 9/02
[52] U.S. Cl. .................................................... 356/350
[58] Field of Search ........................................ 356/350

[56] References Cited

U.S. PATENT DOCUMENTS

| | | | |
|---|---|---|---|
| 4,274,742 | 6/1981 | Lustig | 356/350 |
| 4,491,413 | 1/1985 | Rashleigh | 356/350 |
| 4,673,293 | 6/1987 | Sanders | 356/350 |

OTHER PUBLICATIONS

"Passive Ring Resonator Method for Sensitive Inertial Rotation Measurements in Geophysics and Relativity", Sanders et al, Optics Letters, 11-1981, pp. 569-571.

*Primary Examiner*—Vincent P. McGraw
*Assistant Examiner*—S. A. Turner
*Attorney, Agent, or Firm*—Lahive & Cockfield

[57] ABSTRACT

A Sagnac interferometer gyroscope including periodic generator driving an optical modulator coupled to one end of the fiber optic loop, the signals from the fiber optic loop being coupled through two feedback loops. The first feedback loop operating on a signal equal to the twice the periodic generator signal frequency which is integrated and supplied, together with the signal from the periodic generator to a summing circuit to drive the optical modulator such that it maintains the measurement of the gyroscope output through specific quad points. The second feedback loop operates on a signal at a frequency equal to the frequency of the periodic generator and provides the integrated value of this signal after demodulation to summing circuit, together with a calibration signal, the output signal from the summing circuit being applied to a line stretcher element in the Sagnac fiber optic loop to maintain the output signal at a constant scale factor.

7 Claims, 3 Drawing Sheets (a) APPLIED BIAS (b) SIGNAL GENERATED WHEN $SF \neq SF_0$, (ODD HARMONICS)

(c) SIGNAL GENERATED WHEN $\omega \neq 0$

INTERFEROMETER GYROSCOPE HAVING TWO FEEDBACK LOOPS

FIELD OF THE INVENTION

This invention relates in general to devices and methods for measuring rate of inertial rotation and more particularly to an improved Sagnac interferometer gyroscope.

BACKGROUND OF THE INVENTION

The Sagnac interferometer gyroscope (sig) is a well known device for measuring rate of inertial rotation. The output beam from a laser is split and one portion is passed through an open ended fiber optic loop in a first direction, for example, clockwise, while the second portion is passed through the loop counterclockwise. One portion is passed through a phase modulator prior to coupling to the optical fiber loop, while the light traveling in the opposite direction is coupled through the modulator after passing through the fiber optic loop. The phase difference $\Delta\phi$ between the two outputs is representative of the inertial rate of rotation of the loop, $\Omega$, according to the equation, $$\Delta\phi = \frac{8\pi NA}{\lambda_o C} \Omega \quad (1)$$

where:
N is the number of the loops in the fiber optic ring,
A is the area enclosed by the light path,
C is the speed of light in a vacuum,
$\lambda_o$ is the vacuum wavelength of the source light
The sensitivity, $\epsilon$, of the gyroscope is expressed as $$\epsilon = \frac{4\pi NA}{C\lambda_o} I_o \sin\phi \quad (2)$$

Where $I_o$ is the maximum interferometer output intensity

As indicated from equations (1) and (2), as the phase angle approaches zero, so does the sensitivity. In order to maximize the signal, it is conventional in Sagnac interferometers to have a 90° phase bias and employ a switching technique so that measurements are made at points of maximum sensitivity, namely $(-\pi/2)_o$ and $(+\pi/20_o)$.

One of the problems associated with interferometers of this type has been false indications of rate of inertial rotation because of variations in amplifier gain or light source intensity. Either one of these variations would appear as a change in inertial rotation.

A Description of a Sagnac interferometer gyroscope with some discussion of these sources of error is presented in the following papers: J. L. Davis and S. Ezekiel, "Techniques for Shot-Noise-Limited Inertial Rotation Measurement Using A Multiturn Fiber Sagnac Interferometer", *SPIE Vol.* 157 *Laser Inertial Rotation Sensors* (1978) pp. 131-136;

J. M. Marin and J. T. Winkler, "Fiber Optic Laser Gyro Signal Detection and Processing Technique", *SPIE Vol.* 139 *Guided Wve Optical Systems and Devices* (1978), pp. 98-102;

OBJECTS OF THE INVENTION

It is therefore a primary object of the present invention to provide an improved apparatus for measuring rate of inertial rotation employing an open fiber optic loop where the effects of variations in component values on output signal are minimized.

It is also an object of the present invention to provide a method of operating a Sagnac Interferometer gyroscope such that variations in amplifier gain and light source intensity have a minimal effect on output reading and such that it provides a correction for changes in light transmitting characteristics of the optical fiber loop.

SUMMARY OF THE INVENTION

Broadly speaking, the invention includes a conventional open-ended optical fiber loop together with a laser generator generating the laser beam which is split and coupled to both ends of the fiber loop, such that optical energy is propagated both in the clockwise and in the counterclockwise directions. The apparatus includes a modulating means for modulating the frequency of the laser beam as it is transmitted into one end of the fiber optic loop and for modulating the frequency of the beam which is emitted from that same end of the loop. The optical signals from the opposite ends of the loop are transmitted to a detector which converts them into an electrical signal. A signal generator generates a periodic signal at a frequency $f_m$ and this periodic signal is provided as one input to a summing circuit. The second input to this summing circuit is a signal from the detector which is demodulated at a frequency $2f_m$, and integrated. The output of the summing circuit is used to control the frequency modulator to maintain a phase difference of 90° between energy propagated in opposite directions around said fiber optical loop.

A second feedback loop includes a demodulator for demodulating the signal from the fiber optic loop at a frequency equal to the frequency, $f_m$, of the periodic signal generator. This signal is coupled through an integrator to a path length control means included in the optical fiber loop for varying the effective path length for optical energy transmitted through it according to the value of an applied control signal. This second feedback loop maintains the integrated value of the signal demodulated at the frequency of the periodic signal generator at a constant predetermined value.

PREFERRED EMBODIMENTS

Figure 1:
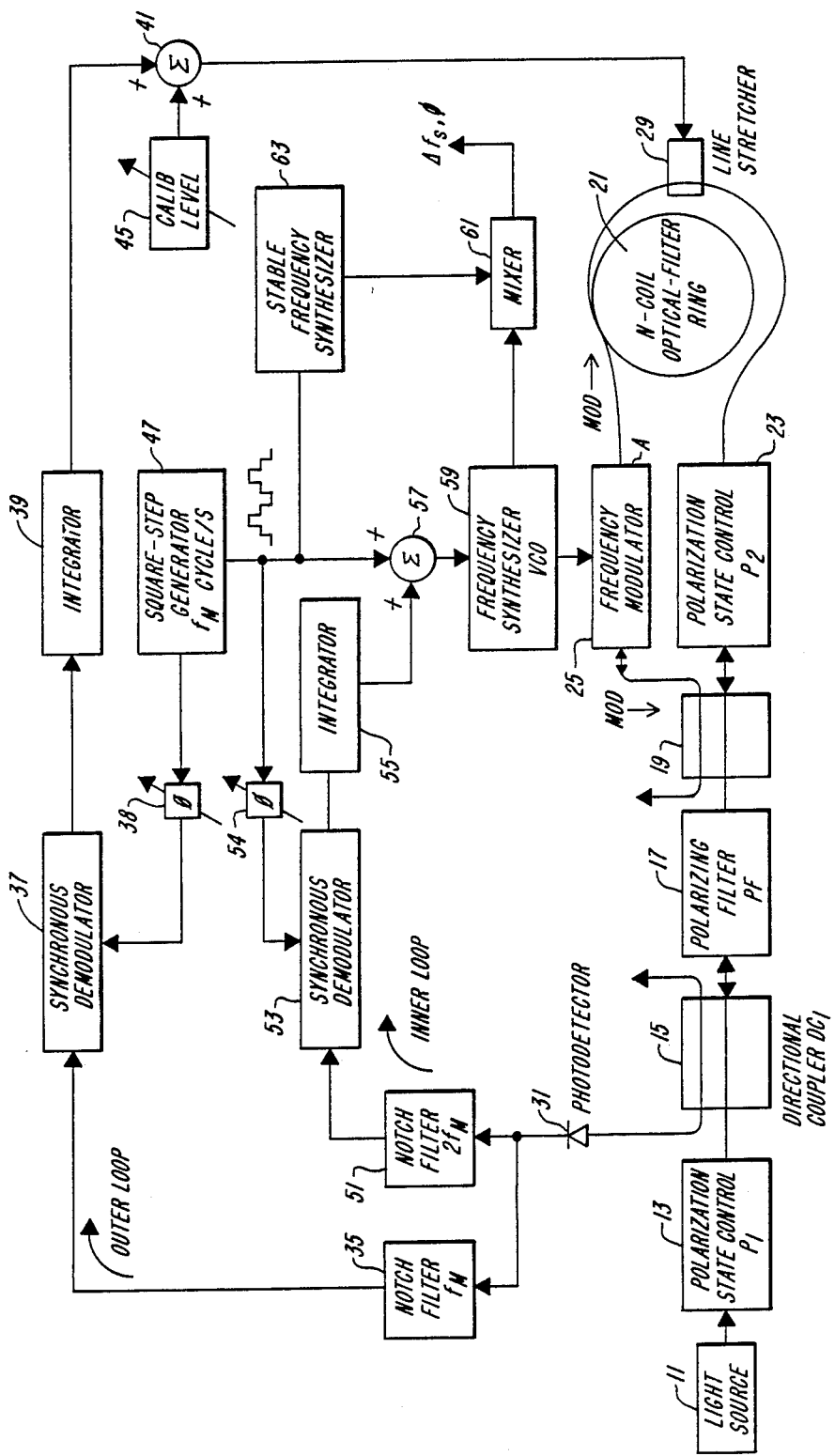
FIG. 1 is an illustration in block diagrammatic form of an interferometer gyroscope constructed in accordance with the principles of this invention.

In FIG. 1 there is illustrated in block diagrammatic form a preferred embodiment of this invention. A conventional laser light source 11 provides a laser output beam through a first polarization control element 13, which is, in turn, coupled through directional coupler 15 to a polarizing filter 17. The output from polarizing filter 17 is coupled through a second directional coupler 19 which provides one portion of the beam through a second polarization state control element 15 to one end of an open-ended optical fiber loop 21. The other portion of the laser beam from coupler 19 is coupled through frequency modulator 25 to the other end of the fiber optic loop 21. The optical fiber loop 21 includes a controllable line stretcher element 29 in it.

With the exception of the line stretcher element 29, the portion of the system above described is a conventional arrangement of the optical portion of a Sagnac interferometer gyroscope.

The laser source 11 is typically a helium neon laser. The polarization state controls and the polarizing filters provide reciprocity for the light travelling in opposite directions around the fiber optic loop 21. Optical fibers often exhibit both linear and circular birefringences, both intrinsically and induced by externally imposed fields. Because of twists, bending, compression and other stresses in the fiber the principal axes and strength of the birefringences may vary along the length of the fiber. The polarization state control elements 13 and 15 overcome this by adjusting the polarization plane of the beam entering into and being emitted from the fiber optical loop to provide that these inherent and environmental effects in the fiber do not produce a phase variation between the output beams.

Figure 2:
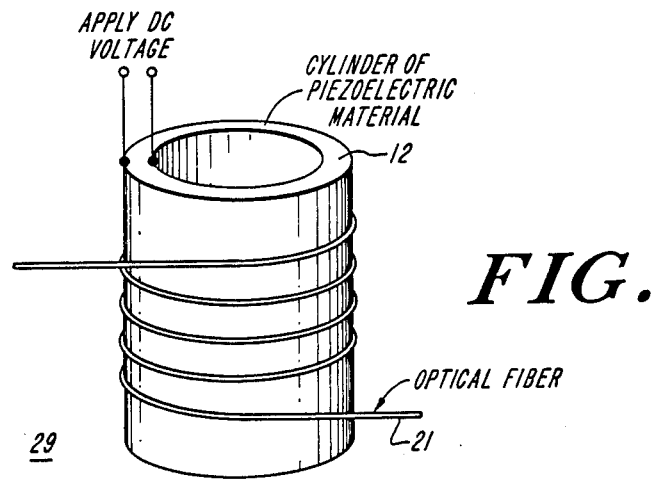
FIG. 2 is a perspective view of a suitable form for line stretcher 29 shown in FIG. 1.

The optical elements themselves are conventional. The couplers 15 and 19 perform the function of beam splitting to provide that portions of the laser beam travel in opposite directions around the fiber optic loop. The incorporation of two directional couplers is necessary in order to balance any time delays introduced in the couplers between the signals traveling in opposite directions as they arrive at the photodetector 31. The optical fiber loop itself can be formed, for example, by a three-meter length of ITT type T-110 single-mode optical fiber. The frequency modulator 25 is an electro-optical modulator. The line stretcher 29 is an element which is formed such that the stress induced by this line stretcher element can be controlled to vary about a mean stress level to compensate for changes at the time of transmission through the fiber induced by changes in the thermal, electrical and mechanical environment other than rotation rate. A suitable line stretcher 29 is illustrated in FIG. 2. In FIG. 2 the cylinder is made of piezoelectric material, e.g., lead-zirconium titanate (PZT). The inner and outer surfaces of the cylinder are coated with metal to form electrodes. The base optical fiber 21 is wound (under less than breaking tension) on the cylinder and bonded to the cylinder. DC voltage is applied to the cylinder in response to a positive signal from summer 41 expands the cylinder, further stretching the optical path beyond its bias length. Less voltage (negative signal) relaxes or contracts the cylinder, shortening the optical path.

The output signal from the photodetector 31 is processed through two separate feedback loops, one being designated the outer loop and the other being designated the inner loop. The outer loop includes a notch filter 35 passing signals at a center frequency $f_m$, to a synchronous demodulator 37 followed by an integrator 39 which provides its output as one input to a summing circuit 41, the other input to the summing circuit being from a calibration level element 45. The output of the summing circuit 41 is applied as a control signal to the line stretcher 29.

The synchronous demodulator 37 demodulates the signal from the filter 35. The square step generator output 47 is coupled through a phase adjustment element 38 to the demodulator 37. The square step generator 47 provides an output staircase signal with a waveform, as indicated, with a zero mean value at a periodic frequency $f_m$.

In the inner loop the output of the photodetector 31 is supplied through a notch filter 51 which passes signals at a center frequency of $2f_m$ to synchronous demodulator 53, whose output is supplied through integrator 55 to a second summing circuit 57. Again the synchronous demodulator 53 is synchronized to the output of the square step generator 47. A second input to summing circuit 57 is supplied directly from the square step generator 47. The output from the summing circuit 57 is supplied as a control signal to a frequency synthesizer voltage controlled oscillator 59, which in turn provides the control signal to the frequency modulator 25. The input from the frequency synthesizer is supplied as one input to a mixer 61. The other input to the mixer 61 is supplied from a stable frequency synthesizer 63 driven by the output from the square step generator 47. The output from the mixer 61 is the output signal representing the applied rotation rate.

Figure 3A:
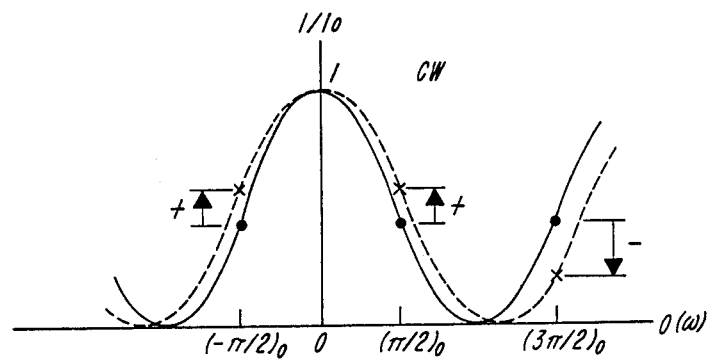
FIGS. 3a and 3b are a graphical illustration of open loop characteristics of a Sagnac interferometer gyroscope.
Figure 3B:
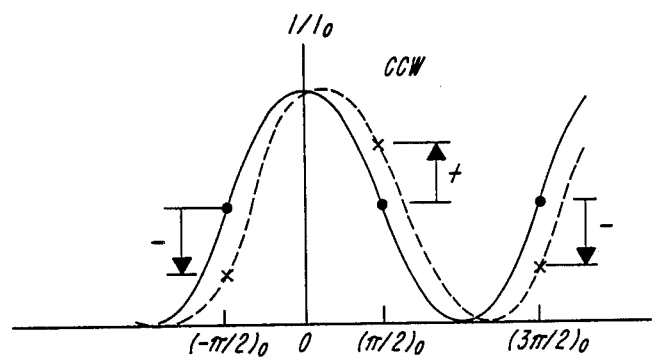

The effects of the environmental influences and rotation rate input on the open loop characteristics of the interferometer gyroscope are shown separately in FIG. 3a and FIG. 3b, respectively. FIG. 3a illustrates the effect of a change in the scale factor of the output signal when the applied biasing signals operate at their original detection points, $$(-\pi/2)_0, (+\pi/2)_0, \text{ and } (3\pi/2)_0.$$

The dotted line shows a decrease in scale factor and, as indicated, the measurement values at the $(-\pi/2)_0$ point and at the $(+\pi/2)_0$ point increase while the signal amplitude at the $(3\pi/2)_0$ decreases.

In FIG. 3b there is illustrated a change of signal as a result of applied rotation rate change for values of fixed applied bias. In FIG. 3b the applied rotation rate is assumed to be counterclockwise. The effect of the applied rotation rate is that the amplitude of response at the $(-\pi/2)_0$ point is decreased, while at point $(+\pi/2)_0$ the amplitude of the signal is increased. As a result of laser and other component amplitude drift problems, open loop measurement of signal amplitudes at the $(+\pi/2)_0$ points does not provide either an accurate measurement or an adequate quad point control signal.

Figure 4A:
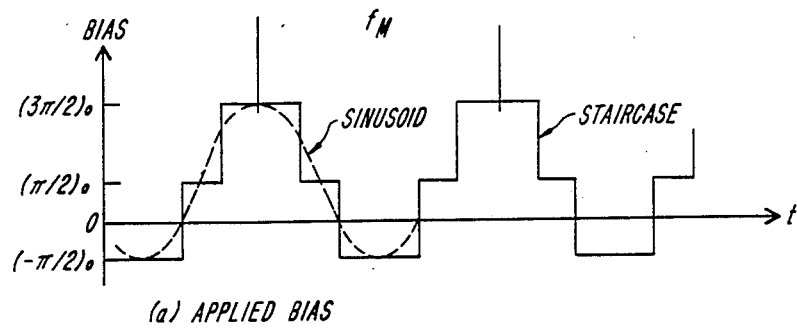
FIGS. 4a–4c are an illustration in graphical form of waveforms occurring at specific points in the gyroscope of this invention.

In FIG. 4a there is illustrated a zero mean periodic staircase waveform at a frequency $f_m$, as generated by the step generator 47. Alternatively the waveform could be, as illustrated by the dotted lines, a sinusoidal wave. In the operation of the inner loop this periodic voltage from generator 47 is summed with the DC voltage supplied by the loop integrator 55 and the sum is applied to the voltage controlled oscillator 59, the output of which is applied to the optical frequency modulator 25. The mean frequency of this modulator 25 is driven by the DC output of the loop integrator and causes the interferometer gyroscope to operate at the $(+\pi/2)_o$ bias point when the loop is closed and the staircase or sinusoid signal drives the bias point periodically between the $(-\pi/2)_o$ and $(+3\pi/2)_o$ bias points. The general technique of utilization of a frequency modulator in one arm of an interferometer gyroscope to apply bias is well known in the prior art.

Figure 4B:
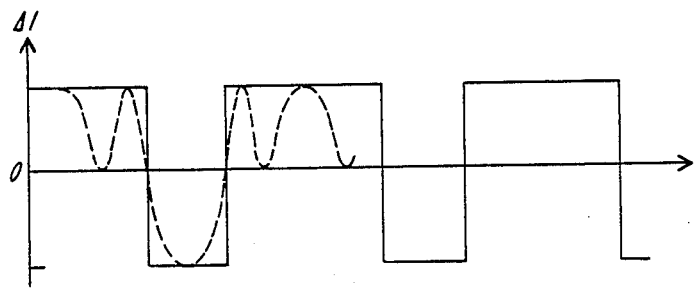

When the outer loop, as described in conjunction with FIG. 1, is open and there is a change in scale factor as illustrated in FIG. 3a, the output of the photodetector 31 has waveform as illustrated in FIG. 4b. The solid line indicates the waveform that will appear when the applied periodic voltage from the generator 47 is a step staircase voltage and the dotted line indicates the waveform that will appear if the applied signal is a sinusoidal one. As indicated the signal has odd harmonics with a predominate spectral component at the frequency, $f_m$. The closing of the outer loop results in a synchronous demodulation of the signal component at a frequency of substantially $f_m$. The demodulated DC output from synchronous demodulator 37 is integrated and summed with the calibration level signal 45 to adjust the scale factor until the amplitude of the output signal from the photodetector 31 at the frequency $f_m$ has been reduced to zero. This is accomplished by the interactive effect with the signal varying the line stretcher element 29, thereby adjusting the scale factor through the optical fiber open loop 21.

Figure 4C:
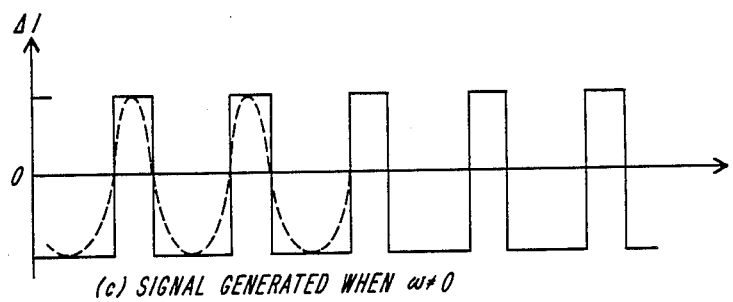

If the inner loop were open and a rotation rate was applied, as illustrated in FIG. 3b to the fiber optic loop 21, the output of the photodetector 31 would appear as illustrated in FIG. 4c. The signal has even harmonics with a predominant spectral component at $2f_m$. Closing this inner loop results in a synchronous demodulation of signal with respect to $2f_m$. The demodulated DC output from synchronous demodulator 53 is integrated and summed with voltage from the periodic generator 47 to generate a signal for adjusting the oscillator frequency to have a mean at the new quad point.

The output signal, $f_\uparrow$, for an applied rotation rate $\Omega$ is the difference in the voltage controlled oscillator frequency with that for zero rotation rate, where, $$f_B = \frac{4A}{\eta_o L \eta} \Omega \qquad (3)$$

where
A is the area enclosed by the fiber optic loop 21,
$\lambda$ is the vacuum wavelength of the source light,
L is the single turn length of the ring and
n is the index and refraction of the optical path.

The system illustrated then provides, in the inner loop, for continued maintenance of the measuring point at the proper quad point despite variations in component values. Similarly, the outer loop maintains the scale factor at a preestablished value by virtue of its interactive control of the prestressing element 29. The resultant gyroscope is practical in that it overcomes the problem of instability of phase modulation as well as independence from external environmental practice.

While the invention has been described in terms of this specific embodiment, other implementations will occur to those skilled in the art.

I claim:

1. An interferometer gyroscope for measuring inertial rotation comprising,
   an open-ended optical fiber loop, said optical-fiber loop including optical-path length control means for controlling the optical path length of said optical fiber loop in response to an applied optical path length control signal;
   a generator for generating a laser beam characterized by a predetermined optical frequency;
   coupling means for coupling said laser beam to the opposite terminal ends of said optical-fiber loop such that electromagnetic energy from said beam is propagated through said optical-fiber loop from one end of said optical-fiber loop to the other end of said optical fiber loop in a first direction, and from said other end to said one end in a second direction, said second direction being opposite to said first direction;
   a first signal generator for generating a periodic signal at a frequency $f_m$;
   modulating means for modulating the frequency of the said beam transmitted into said one end of said optical-fiber loop in a first direction and for modulating the frequency of the said beam transmitted from said one end of said optical-fiber loop in said second direction;
   a modulator control including a means for detecting said counter-propagating electromagnetic energy from the ends of said optical-fiber loop coupled in series with a first demodulator and an integrator establishing a first feedback path between said ends of said optical fiber loop and said modulator to generate a first control signal for controlling said modulating means to maintain the phase difference between said electromagnetic energy propagated in said optical-fiber loop in opposite directions to be substantially ninety degrees out of phase at said means for detecting;
   said first control signal being representative of the sum of said periodic signal and the signal resulting from the demodulation of said detected electromagnetic energy from the ends of said optical-fiber loop at a frequency $2f_m$;
   an optical path length control signal generator including means for detecting said counter-propagating electromagnetic energy from the ends of said optical-fiber loop coupled in series with a second demodulator and an integrator establishing a second feedback path between said ends of said optical-fiber loop and said path length control means, said generator providing means for generating said optical path length control signal and for applying said path length control signal to said path length control means whereby the optical path length of such loop is held constant against external disturbance such that said integrated signal is maintained at a predetermined value resulting in stabilization of the scale factor of said gyroscope apparatus;
   said path length control signal being representative of the integrated signal resulting from the demodulation of said detected electromagnetic energy from the ends of said loop at a frequency $f_m$;
   the magnitude of said first control signal being indicative of the inertial rotation rate of said loop.

2. An interferometer gyroscope in accordance with claim 1 wherein said coupling means includes a multi-port bi-directional coupler, said laser beam being coupled by way of one of said ports to each of two other ports, one of said other ports being coupled by way of said frequency modulator to said first end of said loop and the other of said other ports being coupled to the other end of said loop.

3. An interferometer gyroscope in accordance with claim 1 wherein said periodic signal generator is a square wave step generator.

4. An interferometer gyroscope in accordance with claim 1 further including a voltage controlled oscillator responsive to said first control signal, the output of said voltage control oscillator being adapted to control the modulation frequency of said electromagnetic energy applied to said one end of said loop in said first direction.

5. An interferometer gyroscope in accordance with claim 1 wherein said path length control means is an optical-path stretcher.

6. An interferometer gyroscope in accordance with claim 1 wherein said periodic signal generator is a sine wave generator.

7. An interferometer gyroscope for measuring inertial rotation comprising:
   an optical fiber loop;
   means for varying the optical path length of said loop in response to an applied path length control signal;
   a laser generator for generating a laser beam;
   coupling means for coupling substantially equal portions of electromagnetic energy from said beam to opposite ends of said loop, establishing counter-propagating electromagnetic energy in said loop;
   an optical frequency modulator coupled between said laser generator and said one end of said loop, said modulator being adapted to modulate said beam energy in one direction prior to application of said energy to said first loop end, and to modulate said energy propagating in the opposite direction transmitted from said first loop end;
   a periodic signal generator for generating a periodic signal at frequency $f_m$;
   a photodetector for receiving and heterodyning the electromagnetic beam energy transmitted from both ends of sad loop;
   a first feedback loop path coupled to said photodetector and including means for generating a first control signal for said modulator to maintain a ninety degree phase difference between electromagnetic energy propagated around said loop in one direction and in the opposite direction, said first feedback loop including in sequence a filter adapted for passing signals at frequencies substantially at a predetermined frequency $2f_m$, a synchronous demodulator and an integrator coupled to a summing means for summing the signal from said first feedback loop path and said periodic signal, said summed signal serving to control the modulation frequency of said optical frequency modulator;
   a second feedback loop path coupled between said photodetector and said means for varying the optical path length of said optical fiber loop for generating said path length control signal, said second feedback loop including in sequence, a filter adapted for passing signals at frequencies substantially at $f_m$, a demodulator followed by an integrator and a summing circuit, the output of said integrator being coupled to a first input of said summing circuit, and the output of said summing circuit being connected to said path length varying means, and wherein a predetermined reference signal is coupled to a second input of said summing circuit;
   said modulator control signal being indicative of the inertial rotation of said loop.

* * * * *